March 4, 1947. J. V. HORR 2,416,754
COLLAPSIBLE CARDBOARD DISPLAY DEVICE
Filed Sept. 1, 1944 3 Sheets-Sheet 1
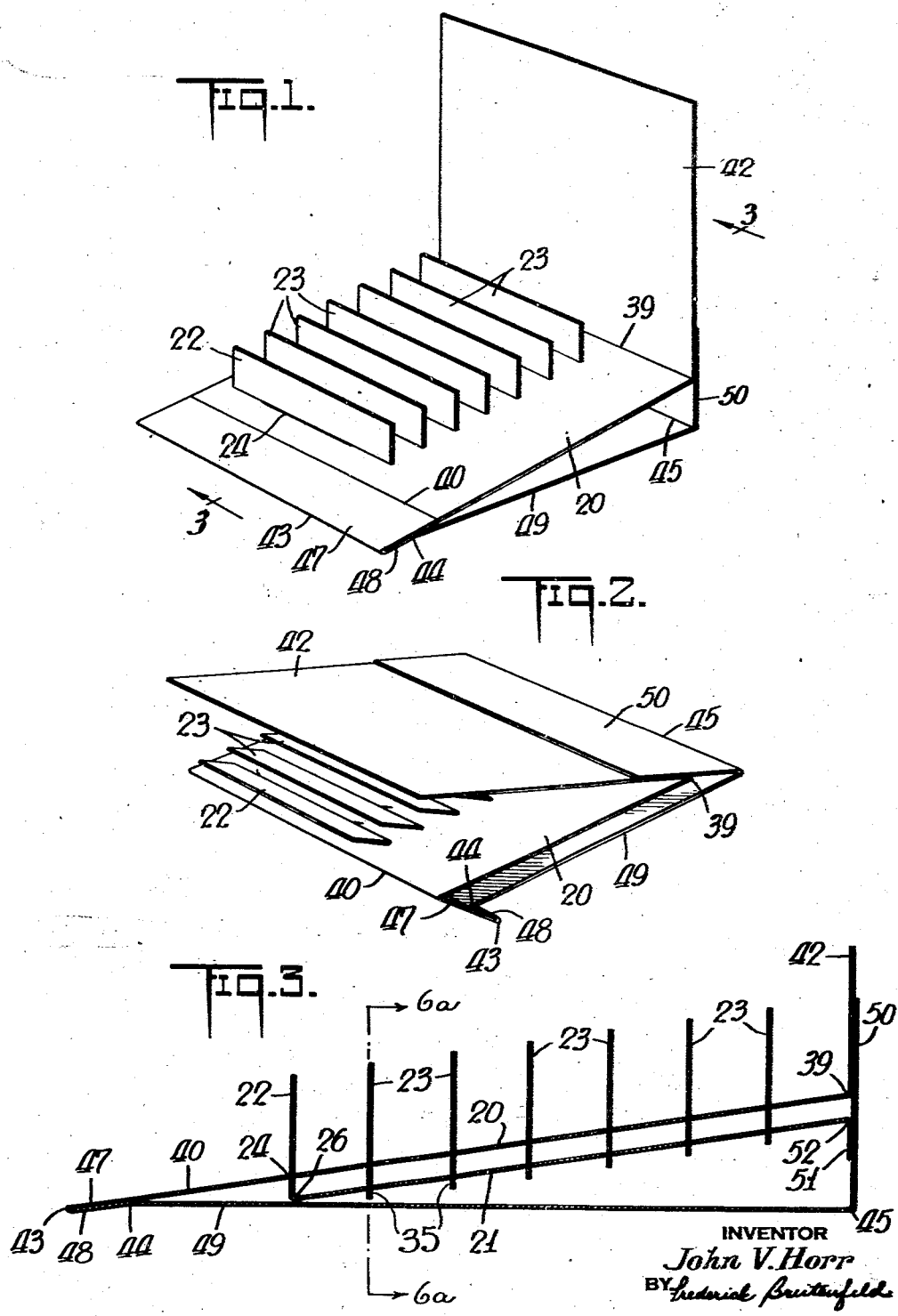

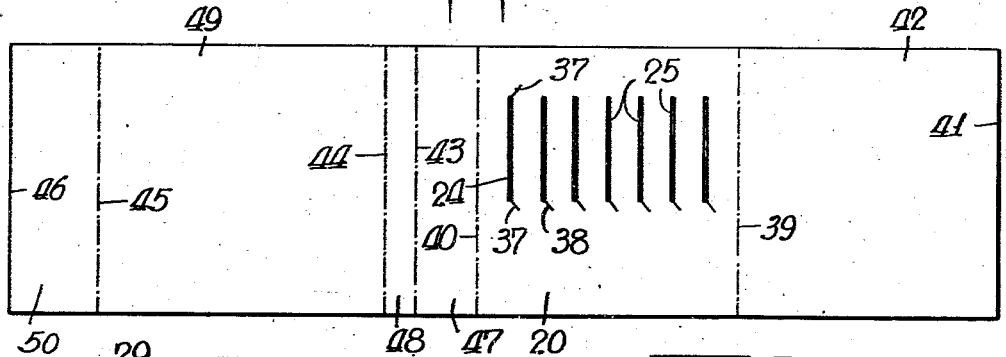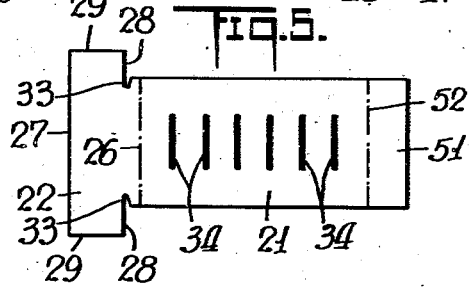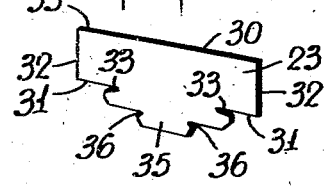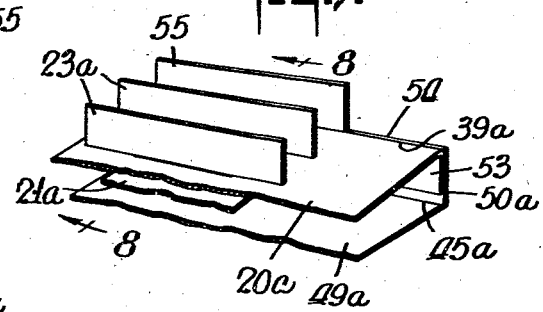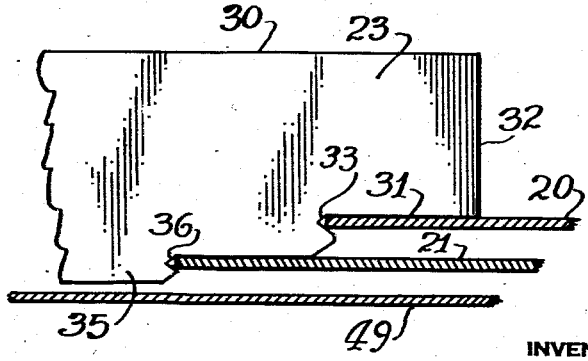

March 4, 1947. J. V. HORR 2,416,754
COLLAPSIBLE CARDBOARD DISPLAY DEVICE
Filed Sept. 1, 1944 3 Sheets-Sheet 3

INVENTOR
John V. Horr
BY Frederick Breitenfeld
ATTORNEY

Patented Mar. 4, 1947

2,416,754

UNITED STATES PATENT OFFICE 2,416,754

COLLAPSIBLE CARDBOARD DISPLAY DEVICE

John V. Herr, North Tarrytown, N. Y., assignor to Einson-Freeman Co., Inc., Long Island City, N. Y., a corporation of Delaware Application September 1, 1944, Serial No. 552,288

6 Claims. (Cl. 35—1)

My present invention relates generally to collapsible cardboard display devices, and has particular reference to a device which may be set up into a condition in which a series of parallel upstanding display panels are arranged one behind the other.

A structure of this type may be employed for a variety of different purposes. By way of example, it may be used in a structure by the aid of which the teaching of certain aspects of meteorology is facilitated. The proper study and evaluation of weather conditions requires a study and understanding of numerous factors which must be considered in three dimensions. Conventional weather maps and charts, no matter how detailed they may be, are necessarily two-dimensional in character. One field of use of the present invention is in the depicting of certain of these factors in a more readily understandable three-dimensional manner.

More particularly, the device aims to present, in combination, a substantially horizontal main panel which may, for example, be caused to bear a depiction of a more or less conventional type of weather map, and upstanding display panels arranged one behind the other in parallel spaced planes and providing front and back surfaces on which there may be depicted elevational representations of meterological conditions in those particular planes. The possibility which is thus afforded of simultaneously viewing an area in plan and also in a series of related elevational sections is strikingly helpful in properly visualizing a meteorological state of affairs in three-dimensional fashion.

In contemplation of this possible use of the device, it becomes important that the upstanding panels be firmly and reliably supported in truly parallel relationships, and that the full display area be visible at all times so that the markings on the upstanding surfaces may properly register with and be complementary to certain related markings on the substantially horizontal base. The structure forming the subject matter of the present invention is especially designed to meet this requirement.

A further objective of the invention is to provide a device of the character mentioned which may be conveniently and expeditiously adjusted from a compact collapsed condition into an operative set-up condition, without requiring any special manipulations or adjustments to lock or otherwise secure the device in this set-up state.

These general objectives are coupled with the further object to provide a device which is relatively simple in structural nature, staunch in character, and inexpensive to manufacture in quantities.

I achieve the foregoing general objects and advantages, and such other objects and advantages as may hereinafter appear or be pointed out, in the manner illustratively exemplified in the accompanying drawings in which:

Figure 1 is a perspective view of a display device of the present character shown in set-up condition;

Figure 2 is a similar view showing the manner in which the device may be collapsed;

Figure 3 is a cross-sectional view taken substantially along the line 3—3 of Figure 1;

Figure 4 is a plan view of one of the blanks entering into the construction of Figure 1;

Figure 5 is a plan view of another of the blanks employed in this structure;

Figure 6 is a perspective view of one of the cross panels;

Figure 6a is a fragmentary cross-sectional view taken substantially along the line 6a—6a of Figure 3;

Figure 7 is a fragmentary perspective view of a slightly modified device;

Figure 8 is a cross-sectional view taken substantially along the line 8—8 of Figure 7;

Figure 9:
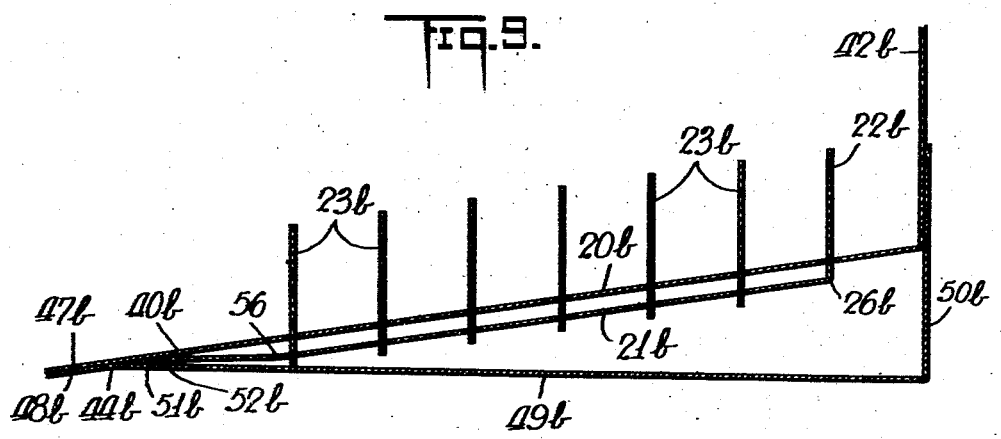
Figure 9 is an elevational view of a modified construction shown in set-up condition.

The design of the present device centers upon a collapsible parallelogrammic structure which consists of a pair of superposed main panels arranged in parallel planes, and a series of parallel cross panels extending crosswise between them. One of the main panels has parallel slots therein, and said cross panels extend into parallel display positions through said slots respectively. At least two of said cross panels are articulated to the main panels so as to provide a staunch structure which may be set-up into a condition in which the display panels stand firmly and reliably erect, or collapsed into a condition in which the display panels and the main panels lie in overlapping and closely superposed relationships. This structure is associated in a special manner with a collapsible support which consists of at least four sections hinged together to form a polygon one of whose sides is defined by one of said main panels, another side of the polygon being suitably articulated to another one of said panels so that the set-up and collapse of the support will effect a corresponding set-up and collapse of the parallelogrammic structure. The polygonal support preferably assumes the form of a four-sided figure of quadrilateral, whose sides are proportioned in a special manner, and it is this preferred type of construction which has been illustrated in the accompanying drawings.

The parallelogrammic structure is most clearly shown in Figure 3 in which the two main panels 20 and 21 are shown in their relatively spaced relationship. Extending crosswise between them are a series of cross panels 22 and 23. The main panel 20 is provided with a series of parallel slots 24 and 25 (Figure 4), and the cross panels project through these slots, respectively. In the embodiment illustrated, the panel 22 forms an integral continuation of the blank of which the main panel 21 is formed (see Figure 5), these two panels being articulated along the hinge line 26. The other cross panels 23 are composed of separate elements (see Figure 6).

Each of the cross panels has a display portion which may be rectangular in shape. In the case of the panel 22, this rectangle is defined by the longitudinal edges 27 and 28 and the end edges 29; and each of the panels 23 has corresponding longitudinal edges 30 and 31 and end edges 32. In each case, the panel is provided with opposed notches 33 adapted to engage with the opposite ends of one of the slots in the main panel 20. This establishes an articulated relation between each cross panel and the main panel 20 along a pivot or hinge axis lying accurately in the plane of the main panel 20. Where the display portion is rectangular in shape, as in the illustrated device, this pivot axis of articulation is substantially aligned with the inner edge 28 of the display panel 22, and with the inner edge 31 of each of the display panels 23.

Each of the display panels 23 is similarly articulated, also, to the main panel 21. The latter is provided with parallel slots 34 (Figure 5), and each of the panels 23 has a relatively narrow tab 35 which extends downwardly through one of the slots. Where the tab 35 joins the body of the panel 23, opposed notches 36 are preferably provided to engage with the ends of the corresponding slot 34. The manner in which the notches 33 and 36 engage, respectively, with the upper and lower main panels 20 and 21, is shown most clearly in Figure 6a.

In assembling the device, the panel 21 is inserted through the slot 24 until the notches 33 of Figure 5 engage with the ends of the slot 24. This operation may be facilitated by providing small inclined slot extensions 37 at the opposite ends of the slot 24, as shown most clearly in Figure 4. Thereafter, the panels 23 are successively inserted through the slots 25 and the slots 34. This operation may be facilitated by providing each of the slots 25 with a small slot extension 38 at one end, as shown in Figure 4. The notches 36 are sufficiently shallow so that the tab 35 may be in each case pressed forcibly through the corresponding slot 34 until these notches 36 snap into engagement with the opposite ends of the slot 34.

The resultant structure is parallelogrammic, hence collapsible as indicated in Figures 1 and 2. Before describing the mode of operation, however, the collapsible support for the device as a whole will be described.

Upon reference to Figure 4, it will be observed that the main panel 20 forms one section of a series of hingedly-connected sections of a continuous single blank of cardboard, substantially rectangular in shape. The parallel transverse hinge lines 39 and 40 define the bounds of the main panel 20. Between the hinge line 39 and the edge 41 of the blank, a section 42 is provided. In similar manner, the parallel hinge lines 43, 44, 45, and the end edge 46, define adjacent sections 47, 48, 49 and 50.

By folding the blank of Figure 4 along the fold lines indicated, and securing the marginal portion of the section 50 (by adhesive means or otherwise) to the inner region of the section 42, as shown most clearly in Figure 2, a four-sided structure is produced. During this folding operation, the section 48 is doubled upon the adjacent region of the section 47 and permanently secured thereto by adhesive means or otherwise. The quadrilateral which is thus formed is not a parallelogram, and the lengths of its sides are specially proportioned. It has two relatively long sides represented by the sections 20 and 49, and two relatively short ends, represented at the rear by the region between the hinge lines 39 and 45, and represented at the front by the region between the hinge lines 40 and 44. The combined length of the section 20 and the rear short end of the quadrilateral is made equal to the combined length of the section 49 and the forward short end of the quadrilateral. Accordingly, the quadrilateral structure may be collapsed by bringing these equally-long pairs of sides into superposed relation. The process of collapse is indicated in Figure 2, it being understood that this figure does not represent the fully-collapsed position of the parts, which ultimately lie in closely superposed relationships defining a substantially flat compact unit which may be conveniently shipped, stored, or stacked with other collapsed units of the same kind.

The nature of this supporting structure is of such a character, however, that by adjusting the parts into the position of Figure 1, a self-sustaining triangular support is defined. In bringing about this adjustment, the section 20 is arranged in a single plane with the forward shorter end of the quadrilateral. By properly designing the parts, this positions the panel 20 along a slight incline, as shown in Figures 1 and 3, and arranges the rear end of the supporting structure in a substantially vertical plane.

So that this set-up and collapse of the support may automatically bring about a corresponding set-up and collapse of the parallelogrammic structure defined by the panels 20, 21, 22, and 23, an articulation is established which, in the case of Figures 1-6, consists in forming a rear flap 51 on the panel 21 and securing this flap, by adhesive means or otherwise, to the rear shorter end of the quadrilateral support. This is shown most clearly in Figure 3.

The flap 51 is secured to the panel 21 along the hinge line 52, and it will now be observed, upon inspection of Figure 3, that the collapsible parallelogrammic structure is defined by the hinge lines 39, 52, 26, and 28 (Figure 5).

Where the device is employed for meteorological education, the main panel 20 is printed or otherwise embellished so that it will be a representation of a weather map or chart, viewed in plan, and the front and rear surfaces of the cross panels (or either set of surfaces alone) are caused to bear related indicia indicating meteorological factors in successive upright planes. The indicia on these upright surfaces may be caused to register accurately with related markings on the panel 20, and an opportunity is thus afforded to visualize, in three dimensions, factors which are otherwise difficult to correlate.

One of the outstanding advantages of the present device lies in the fact that it may be adjusted from the collapsed to the set-up condition, and vice versa, without any manipulations other than to swing the sections of the polygonal support into the desired relationship. When set-up into the condition of Figure 1, the structure is self-sustaining, and the upstanding display panels are accurately aligned and accurately positioned with respect to the main display panel from which they protrude. By merely swinging the parts as indicated in Figure 2, the display panels automatically fold downwardly, and the entire device collapses readily into a substantially flat condition.

Where a rear panel or section 42 is provided for, as in the embodiment hereinbefore described, it may be caused to bear related data or instructions, either on one or both of its faces, and it will be understood that other similar indicia may be provided on any other desired surfaces of the device. It will also be noted that this relatively large section serves as a convenient protective cover for the main map or chart portions when the device is collapsed.

Under certain circumstances, it may be desirable to dispense with the relatively large section 42 and to provide, instead, an additional upright display panel similar to the panels 23. This can be achieved by slightly modifying the structure as indicated in Figures 7 and 8. In this case, the panel 20a is hinged along its rear edge to a relatively narrow flap 53 which is turned downwardly along the hinge line 39a and adhesively secured to the section 50a which is hinged to the section 49a along the line 45a. The section 50a is specially contoured in this case so as to provide an upper edge 54 which projects upwardly no further than the hinge line 39a, and a display portion 55 which corresponds in shape to the upright display panels 23a. In other respects, the construction is the same as that heretofore described, and those parts which remain unchanged have been therefore designated by reference numerals corresponding to those used in connection with the device of Figures 1–6.

The device illustrated in Figures 7 and 8 may be set-up and collapsed in the same manner as the device in Figure 1, and it incorporates the same features and advantages. If desired, a protective cover may be hinged to the side edge of either the main panel 20a or the section 49a, or a protective cover may be otherwise associated with the device to lie over the collapsed display panels when the device is in its inoperative collapsed condition.

Figure 10:
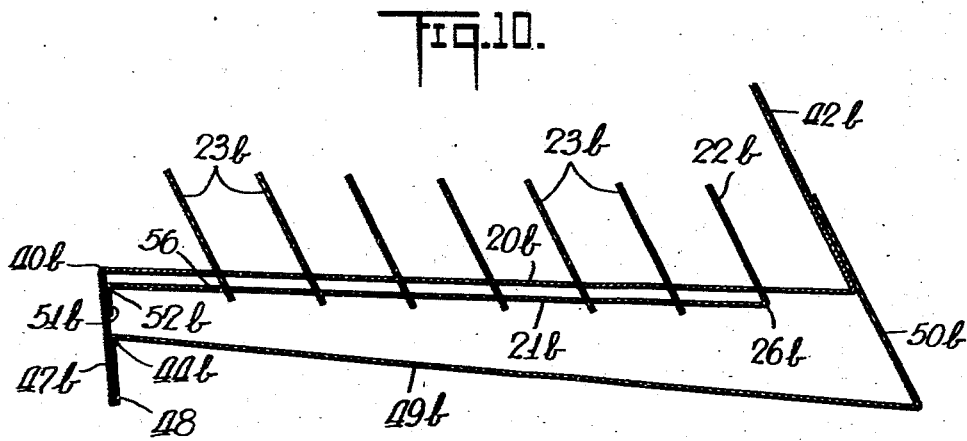
Figure 10 is a view similar to Figure 9 showing the manner in which this device may be collapsed.

The structure illustrated in Figures 9 and 10 is in all respects similar to that of Figure 1 except that the articulation between the parallelogrammic structure and the collapsible support is established at the opposite or forward end of the main panel 21b. In this case, it is the rear upright panel 22b which is hingedly connected at 25b to the panel 21b, and the latter is provided with a flap 51b at its forward end. The flap 51b is secured, by adhesive means or otherwise, to the forward shorter end of the quadrilateral support, and functions in the same way as the flap 51 of Figures 1–6, this articulation serving to correlate the set-up and collapse of the supporting structure as a whole with the corresponding set-up and collapse of the parallelogrammic display structure. In this case, however, it becomes advisable to connect the flap 51b to the panel 21b by means of two spaced hinge lines 52b and 56, so that the parallelogrammic structure of the display panels remains freely adjustable between the desired collapsed and set-up conditions.

In other respects, the structure of Figures 9 and 10 is the same as that of Figure 1 and has the same advantages and features and mode of operation. For this reason, corresponding parts have been correspondingly numbered.

In general, it will be understood that the details herein described and illustrated may be modified in various respects by those skilled in the art without departing from the spirit and scope of the invention as expressed in the appended claims.

Having thus described my invention and illustrated its use, what I claim as new and desire to secure by Letters Patent is:

1. A collapsible cardboard display device comprising: upper and lower main panels arranged in parallel planes, the upper panel having parallel slots therein, a series of parallel cross panels extending cross-wise between said main panels, said cross panels being articulated to the lower panel in hinged relation thereto and extending into parallel display positions through said slots respectively, said panels defining a collapsible parallelogrammic structure; end supporting sections of unequal lengths hinged to the front and rear edges of said upper main panel respectively, a bottom supporting section beneath said lower main panel and hingedly connected to said end supporting sections, said upper main panel and said sections defining a collapsible quadrilateral supporting structure; and means articulating one of said end supporting sections to said lower main panel so that set-up and collapse of said quadrilateral supporting structure will effect a corresponding set-up and collapse of said parallelogrammic structure.

2. A collapsible display device as set forth in claim 1, the sides of said quadrilateral supporting structure being so proportioned that it may be set up in self-sustaining triangular form by swinging said upper main panel and the shorter of said end supporting sections into a single plane.

3. A collapsible display device as set forth in claim 1, the sides of said quadrilateral supporting structure being so proportioned that it may be set up in self-sustaining triangular form by swinging said upper main panel and the shorter of said end supporting sections into a single plane, the combined length of said upper main panel and the longer of said end supporting sections being equal to the combined length of said bottom supporting section and the shorter of said end supporting sections whereby collapse of said supporting structure may be effected by folding said equally-long pairs into superposed relation.

4. A collapsible display device as set forth in claim 1, said lower main panel having parallel slots therein, and said cross panels having notches engaging with the slots in said upper and lower main panels respectively.

5. A collapsible display device as set forth in claim 1, said last-named means comprising a hinged articulation established between the front edge of said lower main panel and the corresponding end supporting section.

6. A collapsible display device as set forth in claim 1, said last-named means comprising a hinged articulation established between the rear edge of said lower main panel and the corresponding end supporting section.

JOHN V. HORR.

REFERENCES CITED

The following references are of record in the file of this patent:

UNITED STATES PATENTS

| Number | Name | Date |
|---|---|---|
| 575,731 | Powers | Jan. 26, 1897 |
| 1,312,961 | De Voe | Aug. 12, 1919 |
| 333,971 | Royall | Jan. 5, 1886 |
| 772,343 | Diehl | Oct. 18, 1904 |
| 895,771 | Lockner | Aug. 11, 1908 |
| 969,315 | Walcutt | Sept. 6, 1910 |
| 2,113,238 | Ouwerkerk | Apr. 5, 1938 |
| 1,745,328 | Ziemmerman | Jan. 28, 1930 |